Figure 1:
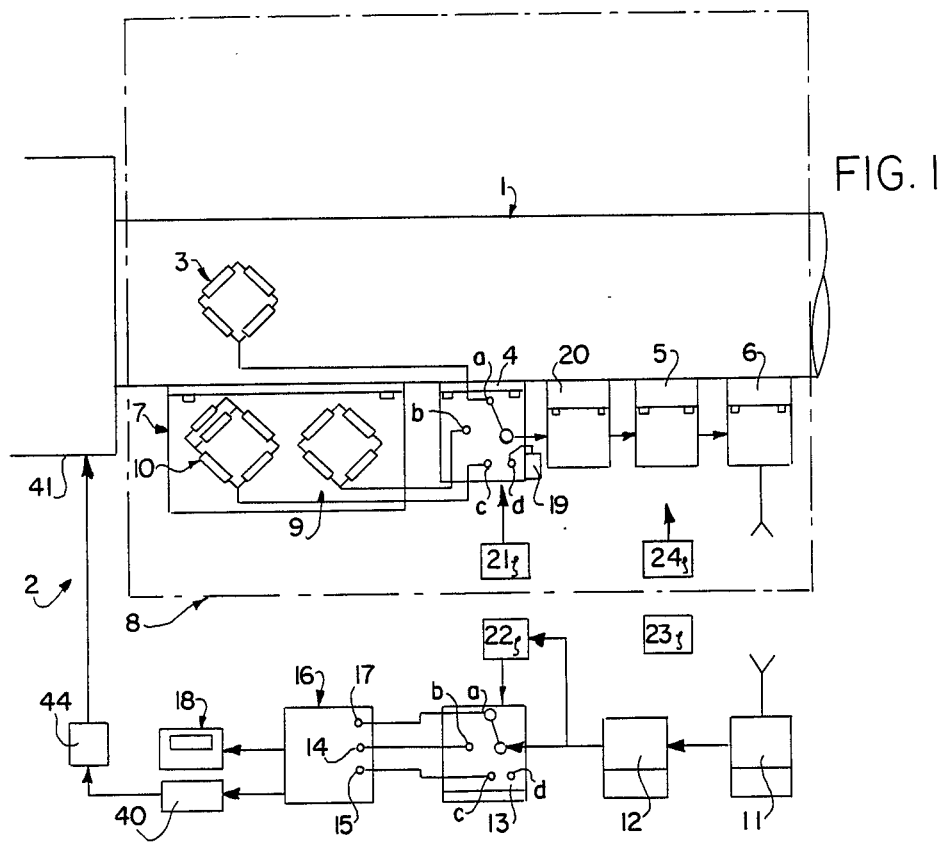

United States Patent [19]

Uitermarkt

[11] Patent Number: 4,763,533
[45] Date of Patent: Aug. 16, 1988

[54] METHOD AND DEVICE FOR MEASURING THE DEFORMATION OF A ROTATING SHAFT

[76] Inventor: Rombartus W. Uitermarkt, No. 68 Dacostastraat, NL-2951 XB Alblasserdam, Netherlands

[21] Appl. No.: 942,848

[22] Filed: Dec. 17, 1986

Related U.S. Application Data

[62] Division of Ser. No. 752,188, Jul. 1, 1985, Pat. No. 4,656,875.

[51] Int. Cl.$^4$ .................. G01L 3/10; G01L 25/00
[52] U.S. Cl. ................... 73/862.35; 73/1 R; 73/1 C; 73/862.49
[58] Field of Search ............ 73/1 R, 1 B, 1 C, 862.49, 73/862.67, 862.35, 765, 766, 769, 771, 773; 324/130; 177/50

[56] References Cited

U.S. PATENT DOCUMENTS 3,535,637 10/1970 Goransson ..................... 73/1 R
3,877,300 4/1975 Ginns ........................... 73/1 R
4,535,854 8/1985 Gard et al. .................. 177/50 X

FOREIGN PATENT DOCUMENTS 2657843 6/1978 Fed. Rep. of Germany ... 73/862.35

OTHER PUBLICATIONS

Suzuki, et al., "Measuring Shaft Torque During . . . Pump-Turbines", *Water Power*, vol. 23, No. 1, 6/77, pp. 20-25.

*Primary Examiner*—Charles A. Ruehl

[57] ABSTRACT

The method and apparatus for deriving a calibrated deformation signal from a signal produced by a strain gauge bridge on a rotating shaft involves further strain gauge bridges, one approximating the deformation bridge signal in the absence of torque and another approximating the deformation bridge signal in the presence of a known torque. The signals are all processed by the same entities and the calibrated signal is derived from a straight line plot determined by determined by the latter two signals. In addition, an axial loading of the shaft is detected by a further strain gauge. Control of power input and of power consumed is from the calibrated deformation signal and the axial loading signal.

10 Claims, 2 Drawing Sheets

METHOD AND DEVICE FOR MEASURING THE DEFORMATION OF A ROTATING SHAFT

This application is a division of copending application Ser. No. 752,188, filed July 1, 1985, now U.S. Pat. No. 4,656,875 of Apr. 14, 1987.

The invention relates to a method of measuring the deformation of a rotating shaft in which calibration means are used for calibrating the measured deformation value.

Such a method is known from U.S. Pat. No. 3,134,279, in which the calibration means are formed by a resistor of known value connected parallel to a strain gauge. These calibration means are temperature sensitive and by this circuitry only the proportionality error of the measuring system is detected.

The invention has for its object to obviate said disadvantage. This is achieved by a method as defined in claim 1. When calibration and zero calibration means pick up signals by means of calibration and zero calibration bridges arranged on an annular metal carrier connected with the shaft and having the same temperature as the measuring bridge, the measuring value originating from the measuring bridge is compensated for temperature, whilst a calibration signal of the same order of magnitude as the measuring signal is obtained. Moreover, by the zero calibration signal picked up by means of a zero calibration bridge a satisfactory interpolation of the proportionality error between zero calibration and calibration value is possible. Finally, owing to the accurate zero calibration value it is possible to measure a propulsion value in the direction of length, which differs only little fron the zero calibration value and which is a measure for the propulsion of, for example, a vessel. The propulsion (propelling pressure) is a very interesting datum for a ship for setting optimum operational conditions of a vessel. The number of revolutions and/or the blade of adjustable propellers can be set in dependence on the measured propelling pressure for different navigation conditions.

A further developed method and the device provided by the invention are described in the subclaims.

The invention will be described more fully hereinafter with reference to a drawing.

The drawing shows schematically in

Figure 2:
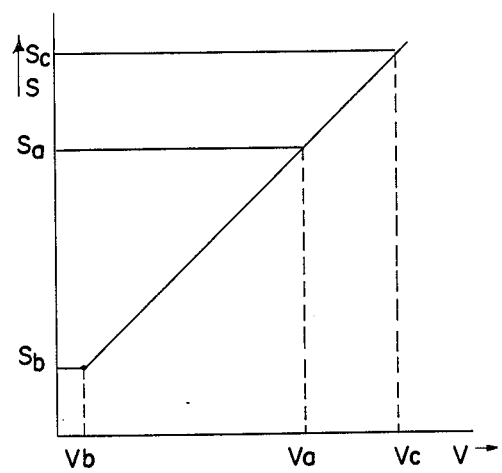
Figure 3:
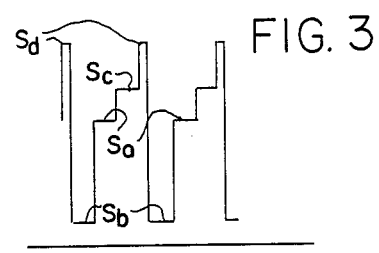
Figure 5:
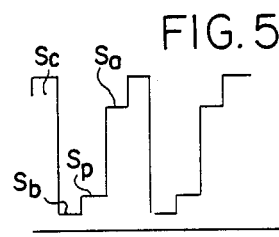
Figure 4:
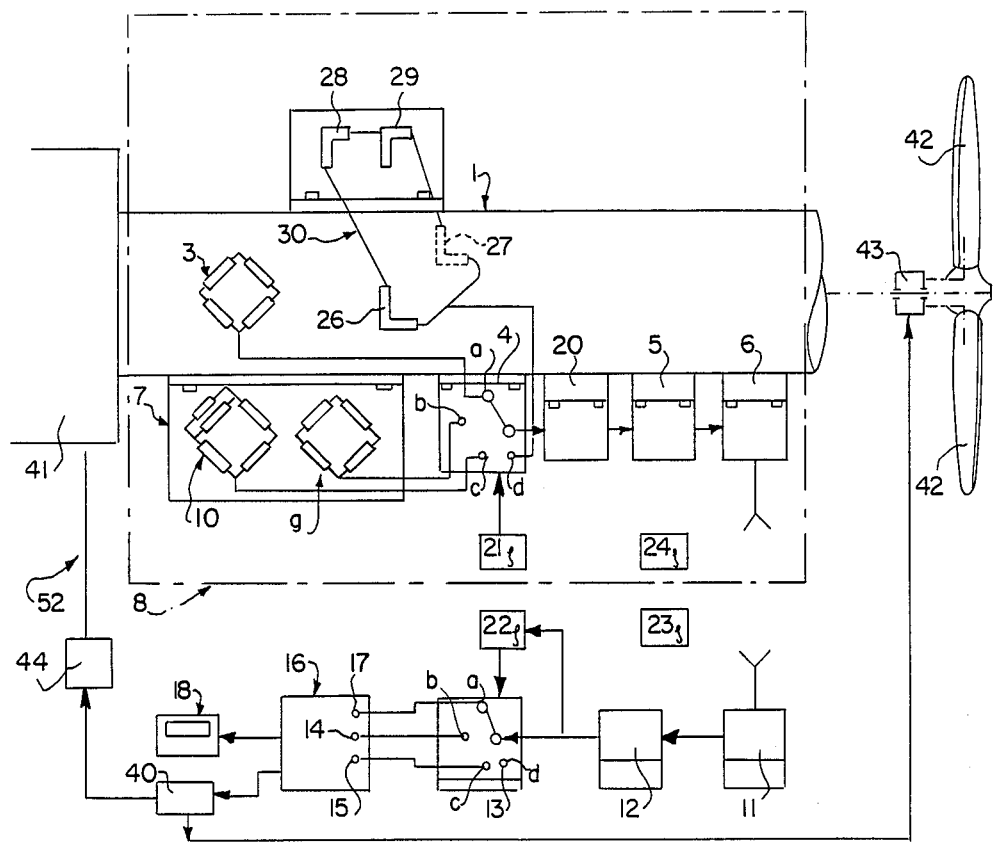
Figure 6:
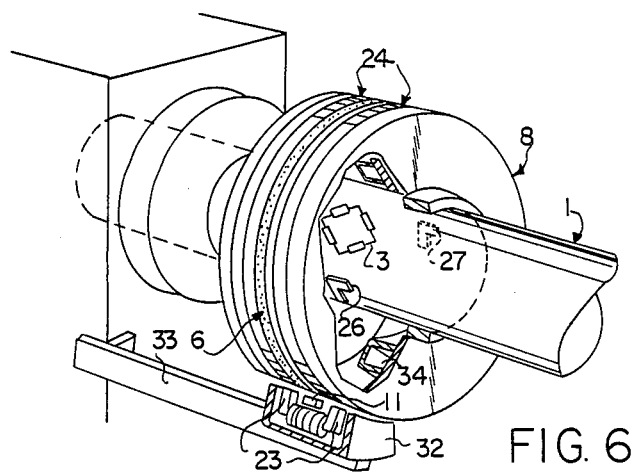

FIGS. 1 and 4 each a rotating shaft provided with schematically shown, different devices embodying the invention, FIG. 2 a graph of the deformation measured by the device of FIGS. 1 and 4, FIGS. 3 and 5 a block diagram of the device of FIGS. 1 and 4 respectively, FIG. 6 a perspective view of the device of FIG. 4.

The rotating shaft 1 is provided with pick-up means 3 formed by a measuring bridge of strain gauges known per se. Furthermore, calibration means are rigidly connected with the shaft 1 so that they rotate together with the shaft 1, said calibration means 7 consisting of a carrying ring 8 having zero calibration means 9 not affected by the deformation of the shaft 1 and proportionality calibration means 10 consisting each of a bridge of strain gauges arranged at such a place in the carrying ring 8 that they have the same temperature as the shaft 1. Finally a first alternating switch 4, amplifying means 20, modulation means 5, transmitting means 6, an oscillator 21 and a secondary feed circuit 24 for the electric feed are rigidly connected with the shaft 1 so that they rotate together with the shaft 1.

There are statically arranged receiving means 11, demodulation means 12, a second alternating switch 13, a synchronous oscillator 22, a primary feeding circuit 23, calculating means 16 and display means 18. The alternating switches 4 and 13 are synchronously adjustable between a measuring position a, a zero calibration position b, a measuring position c and a proportionality calibration position d by means of any known circuit arrangement. This circuit arrangement may comprise a connection 19 of constant voltage $S_d$ exceeding any measuring signal whatsoever. This voltage source 19 is connected to a contact point d of the alternating switch 4. The alternating switch 4 continuously switches in order of succession along the contact points l, b, c, d, a etc. under the control of a master synchronous oscillator 21. Since the slave synchronous oscillator 22 perceives the high $S_d$ signal, it follows by connecting on the contacts d, a, b, c. Then the slave synchronous oscillator 22 has again to perceive the high $D_d$ signal in order to again carry out a through-connection d, a, b, c. Switch 4 changes each time over from the position 2 to contact point a when it perceives a high signal $S_d$ (see FIG. 3), since switch 13 is controlled by synchronous oscillator 22, which is synchronized with oscillator 21 by the signal $S_s$.

In the zero calibration position b of the alternating switching means 4, 13 the zero signal is applied from the zero calibration means 9 to the amplifying means 20, which apply an amplified signal to modulation means 5. The amplified and modulated signal is transmitted by the transmitting means 6, received by the receiving means 11, demodulated by demodulation means 12 and applied, in the zero calibration position b of the alternation switch 13, to the zero calibration signal input 14. The zero calibration signal applied to the calculating means 16 is stored in the memory of the calculating means 16.

When at a different instant, by means of the oscillators 21, 22 the alternating switches 4 and 13 have changed over to their proportionality calibration position c, the proportionality signal of the proportionality calibration means 10 is applied through the same assembly of amplifiying means 20, modulation means 5, demodulation means 12, the transmitting means 6 via the receiving means 11 and the two alternating switches 4 and 13 in processed condition to the proportionality signal input 15 of the calculating means 16, whih temporarily store it in a memory concerned.

At a different instant, after a change-over of alternating switches 4 and 13 into a measuring position a, a measuring signal is applied through the same assembly of amplifying means 20, modulation means 5 and demodulation means 12 via the transmitting means 6 and receiving means 11 and the two alternating switches 4 and 13 in amplified condition to the measuring signal with the most recent zero processing error and the most recent proportionality processing error. The calculation programmed in the calculating means 16 will be explained hereinafter with reference to FIG. 2.

In FIG. 2 is plotted the instantaneous processing behaviour of the assembly 20, 5, 12. Pick-up signals associated with the proportionality calibration value $V_c$ and the zero calibration value $V_b$ arrive at the calculating means 16 as processed signals having the signal magnitude $S_c$ and $S_b$ respectively. From the diagram of FIG. 2 it is apparent that the deformation $V_a$ occurring at a given instant with respect to the output deformation $V_b$—which will usually be equal to zero and is, therefore, termed the zero calibration value—can be calculated by the formula:

$$V_a - V_b = \frac{(S_a - S_b) \cdot (V_c - V_b)}{S_c - S_b}$$

This value calculated in the calculating means 16 is applied to the display means 18, for example, an indicating an/or recording device, as well as to a control device 40 which controls automatically a fuel supply mechanism 44 of a motor 41 driving the shaft 1.

With the aid of the device 52 of FIG. 4 it is possible, for example, to measure the axial compression of a shaft 1 caused by the propulsion of a ship. The numerals of FIG. 4 equal to those of FIG. 1 designate the same functional means. As shown in FIG. 4, there is added a bridge of hook strain gauges 30 formed by two hook strain gauges 26, 27 arranged on both sides of the shaft and two unloaded, corresponding hook strain gauges 28, 29 arranged on the carrying ring 8. The bridge 30 of hook strain gauges may be connected to contact e of the alternating switch 4.

The slave synchronous oscillator 22 is synchronized, for example, by means of the proportionality calibration signal $S_c$ (FIG. 5). By means of the calibration and zero calibration 10, 9 it is possible to accurately distinguish a propulsion signal $S_p$ corresponding to a compression of the shaft 1 from the zero calibration signal $S_b$.

In FIG. 4 the control device 40 controls particularly in dependence on the torque signal $S_a$ the fuel supply mechanism 44 and controls particularly in dependence on the propulsion signal $S_p$ a propeller blade adjusting mechanism 43 for adjusting the propeller blade angle of the propeller 42 driven by the shaft 1. Said control device 40 comprises a computer for calculating and setting the required fuel amount per unit of time and the required propeller angle for the most efficient operation of the ship.

FIG. 6 shows that the aerial of the transmitting means 6 is located substantially in the middle of the annular carrier 8 and opposite the aerial of the fixed pick-up means 11 arranged on an arm 33 in a casing 32. On both sides of the aerials of the transmitting and receiving means 6 and 11 respectively are arranged and secondary and primary feed windings 24 and 23 respectively for the electric feed of the means arranged on the carrying ring 8.

It is noted that the bridges of strain gauges 30 are fed by alternating voltage in order to avoid thermo-couple effects. For an accurate transmission a frequency-modulated signal is used for transmitting/receiving.

On the carrying rings 8 is arranged a ring 31 thermally well coupled with the shaft 1, on which ring 31 are arranged the unloaded strain gauges 28, 29 as well as the bridges 9, 10. An annular cavity 34 is provided in the carrier for accommodating the electric and electronic amplifying, modulation and transmitting means 20, 5 and 6 respectively as well as the alternating switch 4 and the oscillator 21.

I claim:

1. The method of measuring the torsional deformation of a rotating shaft connecting power input means to power-consuming output means, which comprises the steps of:

generating a first signal whose value represents the uncalibrated torsional deformation of the shaft;

generating a pair of further signals whose values differ from each other and one of whose values substantially represents the value which the first signal should have in the absence of torsional deformation of the shaft;

sequentially measuring said first and said further signals to produce a train of signals having values corresponding to the values of said further signals and the value of said first signal;

calculating the calibrated value of the first signal from said train of signals and generating a signal representing such calibrated value of the first signal; and controlling the power supplied by the power input means in accord with the generated signal representing the calibrated value of the first signal.

2. The method of measuring the torsional deformation of a rotating shaft connecting power input means to power-consuming output means, which comprises the steps of:

generating a first signal whose value represents the uncalibrated torsional deformation of the shaft;

generating a pair of further signals whose values differ from each other and one of whose values substantially represents the value which the first signal should have in the absence of torsional deformation of the shaft;

sequentially measuring said first and said further signals to produce a train of signals having values corresponding to the values of said further signals and the value of said first signal;

calculating the calibrated value of the first signal from said train of signals and generating a signal representing such calibrated value of the first signal;

generating another signal whose value represents the axial loading on the shaft; and controlling the power consumed by the output means in accord with said another signal.

3. The method of calculating the calibrated value of the deformation of a shaft, which is being subjected to torque, from a strain gauge bridge producing an uncalibrated signal representing the deformation of the shaft, which comprises the steps of:

intermittently measuring the value of the uncalibrated signal;

intermittently measuring the value of a signal which approximates the value which the strain gauge bridge should yield in the absence of deformation thereof;

intermittently measuring the value of a signal which approximates the value which the strain gauge bridge should yield in the presence of a known deformation thereof;

calculating the calibrated value of the deformation of the shaft from said intermittently measured values;

the calibrated value of the deformation of the shaft being calculated along a straight line connecting the values of successive measured values of the signal which approximates the the value which the strain gauge should yield in the presence of a known deformation and the signal which approximates the value which the strain gauge should yield in the absence of deformation thereof; and controlling power input to the shaft in accord with the calibrated value of the deformation as calculated.

4. The method of calculating the calibrated value of the deformation of a shaft, which is being subjected to torque, from a strain gauge bridge producing an uncalibrated signal representing the deformation of the shaft, which comprises the steps of:

intermittently measuring the value of the uncalibrated signal;

intermittently measuring the value of a signal which approximates the value which the strain gauge bridge should yield in the absence of deformation thereof;

intermittently measuring the value of a signal which approximates the value which the strain gauge bridge should yield in the presence of a known deformation thereof;

calculating the calibrated value of the deformation of the shaft from said intermittently measured values;

the calibrated value of the deformation of the shaft is calculated along a straight line connecting the values of successive measured values of the signal which approximates the the value which the strain gauge should yield in the presence of a known deformation and the signal which approximates the value which the strain gauge should yield in the absence of deformation thereof; and intermittently measuring the value of axial loading of the shaft and controlling the power consumed through the shaft in accord therewith.

5. In combination with a shaft, power input means for applying power input to the shaft and power output means for consuming power delivered through the shaft, first strain gauge bridge means oriented on the shaft for producing an output signal indicative of the torque being transmitted through the shaft, support means external to the shaft, a second strain gauge bridge means mounted on said support means for producing a signal approximating the output of the first strain gauge bridge means in the absence of torque loading thereof, a third strain gauge bridge means mounted on said support means for approximating the output of said first strain gauge bridge means in the presence of a known torque loading thereof, means for sequentially and repetitively measuring the values of the signals produced by said first, second and third strain gauge bridge means, calculating means for relating the measured values of said second and third strain gauge bridge means on a straight line and determining a calibrated value of the signal of said first strain gauge bridge means along such line, and first output means for controlling power applied to the shaft in accord with the calibrated value of the signal of the first strain gauge bridge means.

6. In the combination defined in claim 5 including signal processing means for processing all of the signals from said first, second and third strain gauge bridge means in the same fashion for application to said calculating means.

7. In the combination defined in claim 6 wherein said signal processing means includes transmitter means for electromagnetically transmitting said signals, receiving means for electromagnetically receiving said signals and switching means for synchronizing the transmission and reception of said signals.

8. In the combination defined in claim 7 including means for synchronizing said switching means in accord with a further, reference signal.

9. In the combination defined in claim 6 including means for synchronizing said switching means in accord with the value of the signal produced by said third strain gauge bridge means.

10. In the combination defined in claim 9 including a fourth strain gauge bridge means oriented on said shaft for producing a signal indicative of axial loading on the shaft, and second output means for controlling the power consumed in accord with the signal produced by the fourth strain gauge bridge means.

* * * * *